US008574123B2

(12) United States Patent
Nedorezov et al.

(10) Patent No.: US 8,574,123 B2
(45) Date of Patent: Nov. 5, 2013

(54) METHODS AND SYSTEMS FOR ENGINE CONTROL (75) Inventors: Felix Nedorezov, Rochester Hills, MI (US); Hong Jiang, Canton, MI (US); Alex O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 13/171,381

(22) Filed: Jun. 28, 2011

(65) Prior Publication Data
US 2012/0010792 A1 Jan. 12, 2012

Related U.S. Application Data (63) Continuation-in-part of application No. 12/833,788, filed on Jul. 9, 2010, now Pat. No. 8,328,687.

(51) Int. Cl.
B60W 10/00 (2006.01)
(52) U.S. Cl.
USPC .......................................................... 477/92
(58) Field of Classification Search
USPC .................................................. 477/92, 115
See application file for complete search history.

(56) References Cited

U.S. PATENT DOCUMENTS

| | | | |
|---|---|---|---|
| 4,539,643 A | 9/1985 | Suzuki et al. | |
| 6,190,284 B1 | 2/2001 | Kuroda et al. | |
| 6,334,834 B1 | 1/2002 | Mizutani et al. | |
| 6,344,834 B1 | 2/2002 | Josypenko | |
| 6,951,525 B2 | 10/2005 | Ries-Mueller | |
| 7,226,388 B2 * | 6/2007 | Berger | 477/115 |
| 7,243,011 B2 | 7/2007 | Koenig et al. | |
| 7,316,631 B2 | 1/2008 | Tsunekawa | |
| 7,329,206 B2 | 2/2008 | Tanaka | |
| 7,683,503 B2 | 3/2010 | Yamaguchi | |
| 8,070,648 B2 * | 12/2011 | Soliman et al. | 477/3 |
| 8,328,687 B2 * | 12/2012 | Gibson et al. | 477/92 |
| 8,414,456 B2 * | 4/2013 | Nedorezov et al. | 477/115 |
| 8,454,476 B2 * | 6/2013 | Gibson et al. | 477/92 |
| 2005/0133006 A1 | 6/2005 | Frenz et al. | |
| 2010/0174459 A1 * | 7/2010 | Gibson et al. | 701/54 |
| 2011/0053735 A1 | 3/2011 | Lewis et al. | |
| 2011/0054765 A1 | 3/2011 | Lewis et al. | |
| 2011/0136621 A1 * | 6/2011 | Nedorezov et al. | 477/77 |
| 2012/0010045 A1 * | 1/2012 | Nedorezov et al. | 477/79 |
| 2012/0115679 A1 * | 5/2012 | Doering et al. | 477/70 |

FOREIGN PATENT DOCUMENTS

| | | |
|---|---|---|
| EP | 1 069 346 A2 | 1/2001 |
| EP | 1 344 673 A2 | 9/2003 |

OTHER PUBLICATIONS

Gibson, Alex O'Connor et al, "Method and System for Engine Control," U.S. Appl. No. 13/171,358, filed Jun. 28, 2011, 47 pages.

* cited by examiner

*Primary Examiner* — Dirk Wright
(74) *Attorney, Agent, or Firm* — Julia Voutyras; Alleman Hall McCoy Russell & Tuttle LLP (57) ABSTRACT

Systems and methods are provided for restarting an engine that can be selectively deactivated during idle-stop conditions. In one embodiment, the engine is restarted with torque reduction over an interval of the restart, for example, by upshifting the transmission. In response to a vehicle launch request, the torque reduction is decreased, for example, by downshifting the transmission, to expedite return of driveline torque.

20 Claims, 7 Drawing Sheets

METHODS AND SYSTEMS FOR ENGINE CONTROL

CROSS REFERENCE TO RELATED APPLICATIONS

The present application is a continuation-in-part of U.S. patent application Ser. No. 12/833,788, entitled "METHOD FOR CONTROLLING AN ENGINE THAT MAY BE AUTOMATICALLY STOPPED," filed Jul. 9, 2010, the disclosure of which is hereby incorporated by reference.

FIELD

The present application relates to methods and systems for controlling an engine shut-down responsive to idle-stop conditions, and a subsequent engine restart from the idle-stop.

BACKGROUND AND SUMMARY

Vehicles have been developed to perform an idle-stop when idle-stop conditions are met and then automatically restart the engine when restart conditions are met. Such idle-stop systems enable fuel savings, reduction in exhaust emissions, reduction in noise, and the like.

A number of approaches have been developed to control the torque relayed between the engine and the wheels of the vehicle during idle-stops and subsequent restarts. For example, the torque conveyed may be reduced by engaging one or more transmission gears, tying up the transmission to a transmission case, applying an alternator load on the engine, shifting transmission gears, etc.

However, the inventors have recognized a potential issue with such approaches. While the various approaches may improve torque mitigation during an engine restart, they may also result in reduced driveline torque. Specifically, there may be a reduction in the amount of torque transmitted from the engine to the driving wheels during the restart. Consequently, in response to an accelerator pedal tip-in by the vehicle operator, a desirable fast launch may not be achieved. As such, this may be perceived by the vehicle operator as a sluggish vehicle performance. Additionally, NVH issues may arise. Overall, the quality of the engine restart may be degraded.

In one example, the above issue may be at least partly addressed by a method of operating a vehicle engine coupled to a transmission. In one embodiment, the method comprises, during an engine restart from idle-stop, when operator torque demand is lower than a threshold, reducing an engine torque conveyed to vehicle wheels over an interval of the engine restart. Then, in response to the operator torque demand being higher than the threshold, decreasing the engine torque reduction. In this way, torque reduction can be advantageously used during an engine restart to reduce vehicle lurch, while the torque reduction can be lowered to return driveline torque and expedite vehicle launch.

In one example, torque reduction during the engine restart may be achieved by restarting the engine with the transmission upshifted to a higher gear. The transmission may be upshifted at the onset of the restart or during the preceding idle-stop. In response to a torque demand being higher than a threshold, such as during an accelerator pedal tip-in by the vehicle operator, the driveline torque may be substantially immediately restored by downshifting the transmission to a lower gear, even if the engine speed is below a threshold engine speed. In another example, the engine shaft output torque may be reduced during the engine restart via adjustments to an engine torque (for example, by applying an alternator load on the engine, by skipping one or more combustion events, by retarding spark timing, etc.) and/or a transmission torque (for example, by engaging one or more transmission clutches, by varying an amount of transmission clutch slippage, by tying up the transmission, by upshifting the transmission, etc.). In response to the tip-in, based on the amount of driveline torque requested, the transmission may be downshifted and/or the engine shaft output torque reduction may be decreased (e.g., by lowering the engine torque reduction and/or the transmission torque reduction). In comparison, if the torque demand is lower than the threshold, the transmission may be downshifted only after the engine speed has reached a threshold engine speed (e.g., an idling speed).

In this way, torque reduction may be used over an interval of the engine restart to reduce the effects of an engine restart torque spike. By decreasing (e.g., stopping) the torque reduction based on the driveline torque requested, the vehicle may be better transitioned through the engine restart torque spike while also reducing the time required to provide the requested driveline torque. Additionally, the restart torque spike can be blended with the vehicle acceleration to improve the quality of the engine restart.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
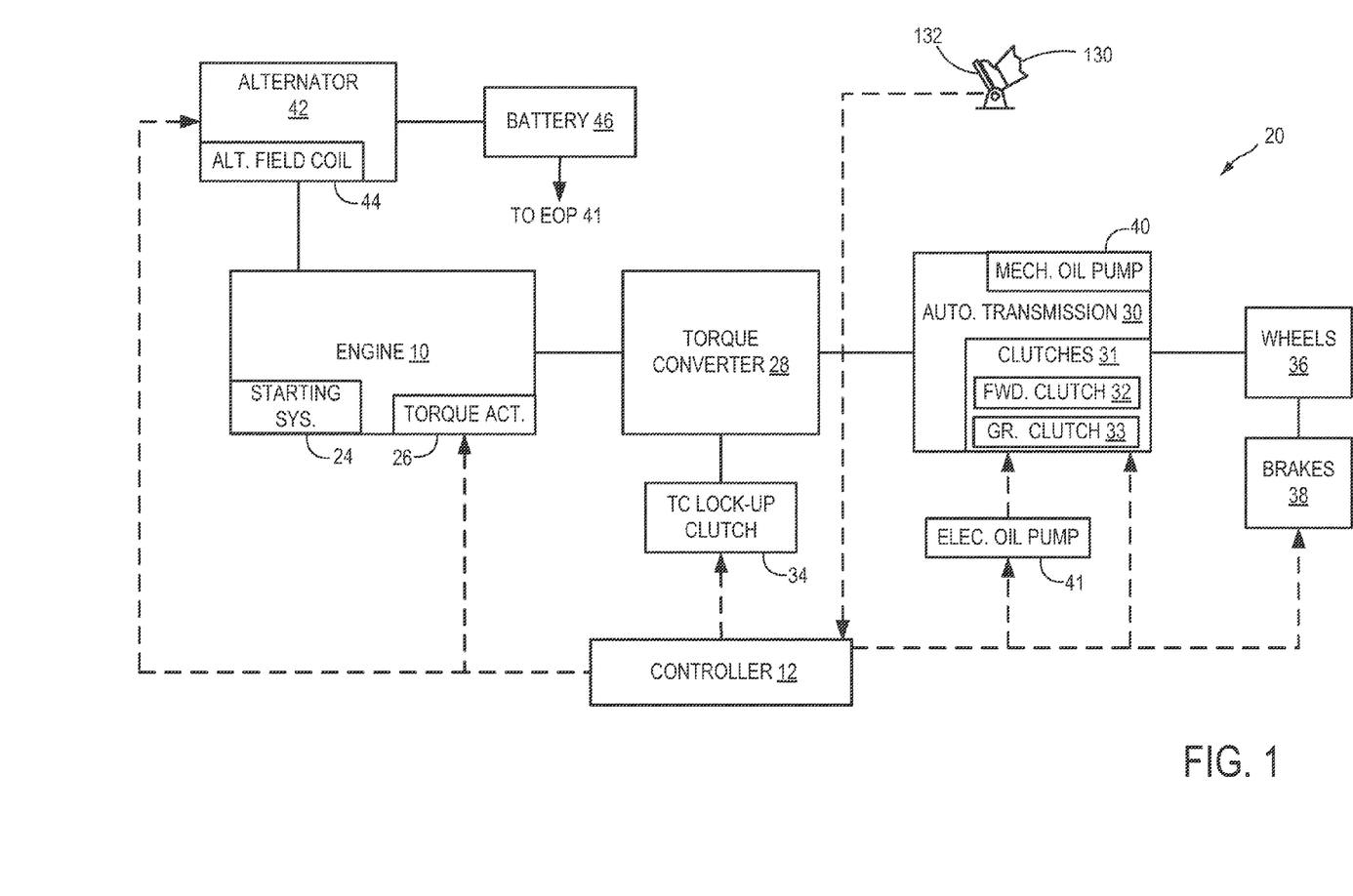
FIG. 1 shows an example vehicle system layout, including details of a vehicle drive-train.
Figure 2:
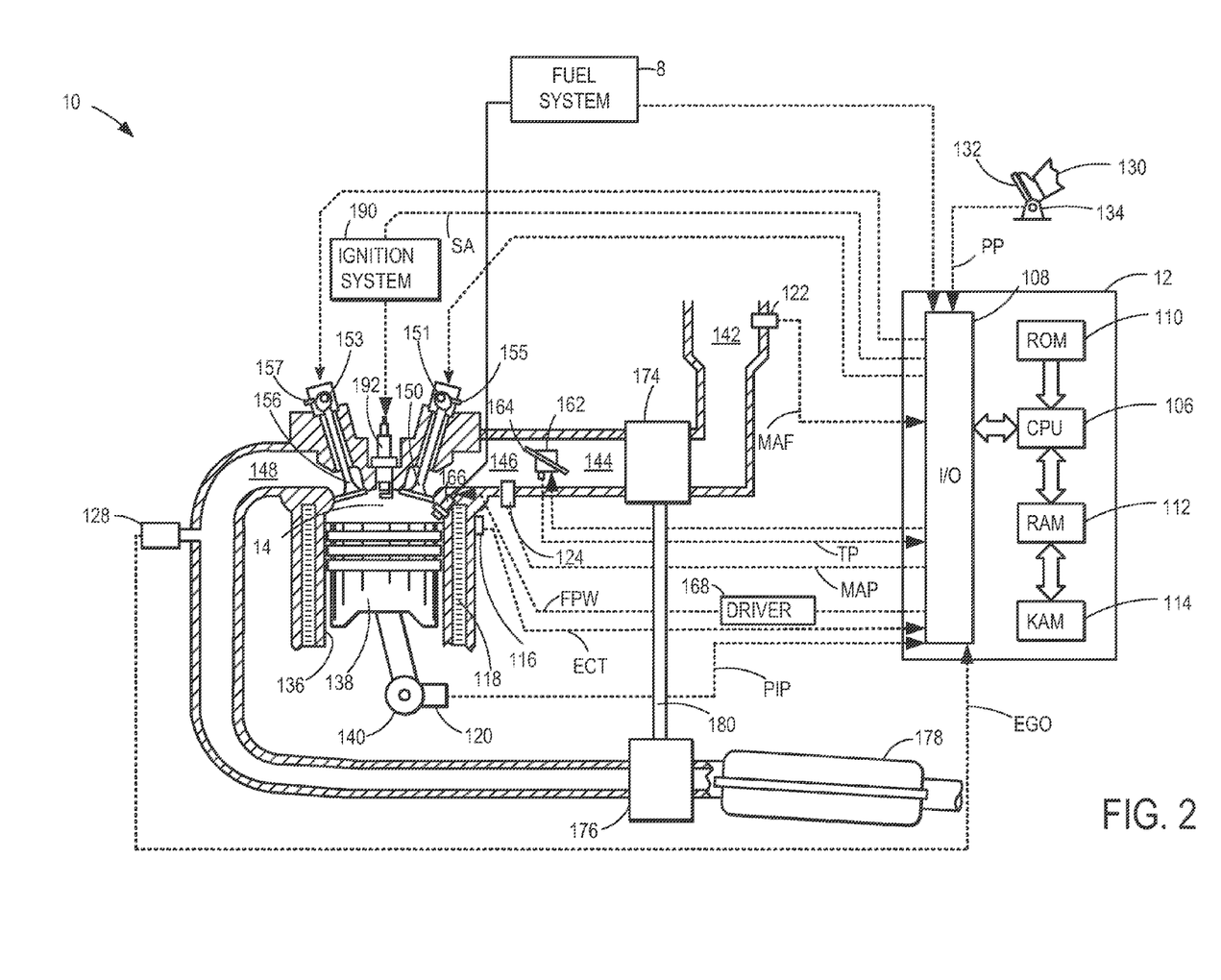
FIG. 2 shows a partial engine view.

The following description relates to systems and methods for controlling a vehicle engine system that is selectively deactivatable in response to idle-stop conditions (such as the engine system of FIGS. 1-2). The engine system may be coupled to a transmission. During automatic engine restart conditions, an amount of torque conveyed from the rotating engine to the vehicle wheels is reduced over an interval of the restart to reduce the effects of an engine restart speed spike (FIG. 5). In response to a vehicle launch request from the operator, the torque reduction may be decreased to expedite the return of driveline torque. An engine controller may be configured to perform control routines, such as those depicted in FIGS. 3-4, to shutdown the engine during idle-stop conditions with the transmission shifted to a higher gear, and restart the engine with the transmission upshifted during automatic engine restart conditions. In response to an elevated torque demand during the restart, the controller may downshift the transmission to return driveline torque. The conveyed torque may additionally, or optionally, be reduced via various engine torque and/or transmission torque reduction approaches. Likewise, driveline torque may be restored by restoring the engine shaft output torque. The concepts and routines introduced herein are further clarified with example engine shutdown and restart scenarios in FIGS. 6A-C. In this way, a lag in vehicle launch can be reduced and the quality of the engine restart can be improved.

FIG. 1 is a block diagram of a vehicle drive-train 20. Drive-train 20 may be powered by engine 10. Engine 10 may be started with an engine starting system 24 including a motor-driven starter, for example. The starter motor may be operated using current from battery 46, for example. Further, engine 10 may generate or adjust torque via torque actuator 26, such as a fuel injector, throttle, etc.

An engine output torque may be transmitted to torque converter 28 to drive an automatic transmission 30. Further, one or more clutches 31 may be engaged, including forward clutch 32, to propel a vehicle. In one example, the torque converter 28 may be referred to as a component of the transmission 30. Further, transmission 30 may include a plurality of gear clutches 33 that may be engaged as needed to activate a plurality of fixed transmission gear ratios. Specifically, by adjusting the engagement of the plurality of gear clutches 33, the transmission may be shifted between a higher gear (that is, a gear with a lower gear ratio) and a lower gear (that is, a gear with a higher gear ratio). As such, in the higher gear, a lower torque multiplication may be achieved across the transmission while in the lower gear, a higher torque multiplication may be achieved across the transmission. As elaborated herein, a controller may vary the transmission gear to adjust an amount of torque conveyed from the engine, across the transmission to vehicle wheels 36 (that is, an engine shaft output torque).

The output of the torque converter may in turn be controlled by torque converter lock-up clutch 34. For example, when torque converter lock-up clutch 34 is fully disengaged, torque converter 28 transmits engine torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter clutch to an input shaft (not shown) of transmission 30. Alternatively, the torque converter lock-up clutch 34 may be partially engaged, thereby enabling the amount of torque relayed to the transmission to be adjusted. A controller 12 may be configured to adjust the amount of torque transmitted by torque converter 28 by adjusting the torque converter lock-up clutch in response to various engine operating conditions, or based on a driver-based engine operation request. In one example, an engine operation request may be received from the vehicle operator 130 via an accelerator pedal 132, as further described herein.

Torque output from the automatic transmission 30 may in turn be relayed to wheels 36 to propel the vehicle. Specifically, automatic transmission 30 may transfer an input driving torque at the input shaft (not shown) responsive to a vehicle traveling condition before transmitting an output driving torque to the wheels.

Further, a frictional force may be applied to wheels 30 by engaging wheel brakes 38. In one example, wheel brakes 38 may be engaged in response to the driver pressing his foot on a brake pedal (not shown). In the same way, a frictional force may be reduced to wheels 36 by disengaging wheel brakes 38 in response to the driver releasing his foot from the brake pedal. Further, vehicle brakes may apply a frictional force to wheels 36 as part of an automated engine stopping procedure.

A mechanical oil pump 40 may be in fluid communication with automatic transmission 30 to provide hydraulic pressure to engage various clutches 31, such as forward clutch 32, gear clutches 33, and/or torque converter lock-up clutch 34. Mechanical oil pump 40 may be operated in accordance with torque converter 28, and may be driven by the rotation of the engine or transmission input shaft, for example. Thus, the hydraulic pressure generated in mechanical oil pump 40 may increase as an engine speed increases, and may decrease as an engine speed decreases. An electric oil pump 41, also in fluid communication with the automatic transmission but operating independent from the driving force of engine 10 or transmission 30, may be provided to supplement the hydraulic pressure of the mechanical oil pump 40. Electric oil pump 41 may be driven by an electric motor (not shown) to which an electric power may be supplied, for example by battery 46.

Vehicle system components outside of the drivetrain, that is accessory components, may include an alternator 42 and a battery 46. Alternator 42 may be configured to convert the mechanical energy generated while running engine 10 to electrical energy for storage in battery 46. Alternator 42 may include an alternator field coil 44 and/or an alternator clutch (not shown). As such, when the alternator clutch is engaged, torque output from the running engine may be relayed to alternator 42 along an alternator input shaft (not shown) and use to charge battery 46. However, under certain conditions, for example when the engine is undergoing an idle-stop and/or while the engine is cranking, the controller 12 may be configured to selectively engage (e.g., at least partially engage) the alternator clutch and relay the accessory torque generated in alternator 42 to reduce the engine torque. Alternatively, the controller 12 may energize the alternator field coil 44 by applying a current. Accordingly, an alternator load may be applied on the spinning engine to reduce the engine torque. As elaborated herein, by adjusting the alternator load applied on the engine, torque reduction may be varied.

A controller 12 may be configured to receive inputs from engine 10, as shown in more detail in FIG. 2, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate an engine shutdown by shutting off fuel and spark to the engine. Further, to maintain an amount of torsion in the transmission, the controller may ground rotating elements of transmission 30 to a case of the transmission and thereby to the frame of the vehicle. As further elaborated below, when the engine is below a threshold speed, the controller may engage one or more transmission clutches, such as forward clutch 32, and lock the engaged transmission clutch(es) to the transmission case and vehicle frame. A clutch pressure may be varied (e.g., increased) to adjust the engagement state of a transmission clutch, and provide a desired amount of transmission torsion. In one example, during the engine shutdown, hydraulic pressure for clutch modulation may be provided by enabling electric oil pump 41, if sufficient hydraulic pressure cannot be provided by mechanical oil pump 40.

When restart conditions are satisfied, controller 12 may reactivate the engine by resuming cylinder combustion. As further elaborated with reference to FIGS. 3-4, a torque conveyed from the rotating engine to the vehicle wheels (that is, an engine shaft output torque) may be reduced over an interval of the engine restart. The torque reduction may be achieved via various combinations of engine torque reduction and transmission torque reduction. The torque reduction approach may be selected based on the amount of torque demanded, and optionally further based on an engine speed at which the torque demand is received. As elaborated in FIG. 5, during an engine restart, an engine speed spike (and a corresponding engine torque spike) may occur. In one example, when a smaller torque reduction is required, either an engine torque or a transmission torque reduction approach may be used. In comparison, when a larger torque reduction is required, both engine torque and transmission torque reduction approaches may be used.

In another example, during the engine speed spike, torque reduction may be achieved at least via engine torque reduction approaches (such as the application of an alternator load, skipping of one or more combustion events, spark retard, etc.). In comparison, after transitioning through the engine speed spike, torque reduction may be achieved at least via transmission torque reduction approaches (such as upshifting of the transmission to a higher gear, maintaining transmission tie-up, engaging transmission clutches, etc.). For example, the transmission may be held or upshifted to a transmission gear higher than the transmission first gear (gear_1), such as a transmission second gear (gear_2), third gear (gear_3) or fourth gear (gear_4), with or without the transmission being tied up, after which the transmission may be tied-up with an amount of slippage (herein also referred to as a "soft" tie-up) during a downshift of the transmission to the transmission first gear (gear_1).

If the torque demand is higher, for example, if the vehicle operator wants to launch the vehicle by pressing the accelerator pedal, the torque reduction may be decreased. For example, the engine torque reduction and/or the transmission torque reduction may be decreased based on the amount of torque demanded by the operator, and optionally further based on an engine speed at which the operator torque demand is received. In one example, when a smaller decrease in torque reduction is required (such as when the accelerator pedal is pushed in by a smaller amount to a first position), either the engine torque or the transmission torque reduction may be decreased. In comparison, when a larger torque reduction is required (such as when the accelerator pedal is pushed in by a larger amount to a second position), both engine torque and transmission torque reduction may be decreased. That is, if the operator torque demand cannot be supplied by decreasing either engine torque reduction or transmission torque reduction, all torque reduction approaches may be decreased (e.g., stopped).

As another example, when the torque demand is received before a threshold engine speed (such as, before the engine speed spike), at least the engine torque reduction may be stopped. In comparison, if the torque demand is received after the threshold speed, at least the transmission torque reduction may be stopped. Additionally, the transmission may be released from a tie-up to improve vehicle launch. Further, the transmission may be transitioned from the higher gear (e.g., gear_3) to the lower gear (e.g., gear_1) soon after the torque demand trigger is generated. Example torque reduction and torque reduction removal approaches during an engine restart are elaborated herein with reference to FIGS. 5 and 6A-C.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 199, intake/exhaust valves and cams, etc. The controller may receive input data from the various sensors, process the input data, and trigger the actuators in response to the processed input data based on instruction or code programmed therein corresponding to one or more routines. Example control routines are described herein with regard to FIGS. 3-4.

Figure 3:
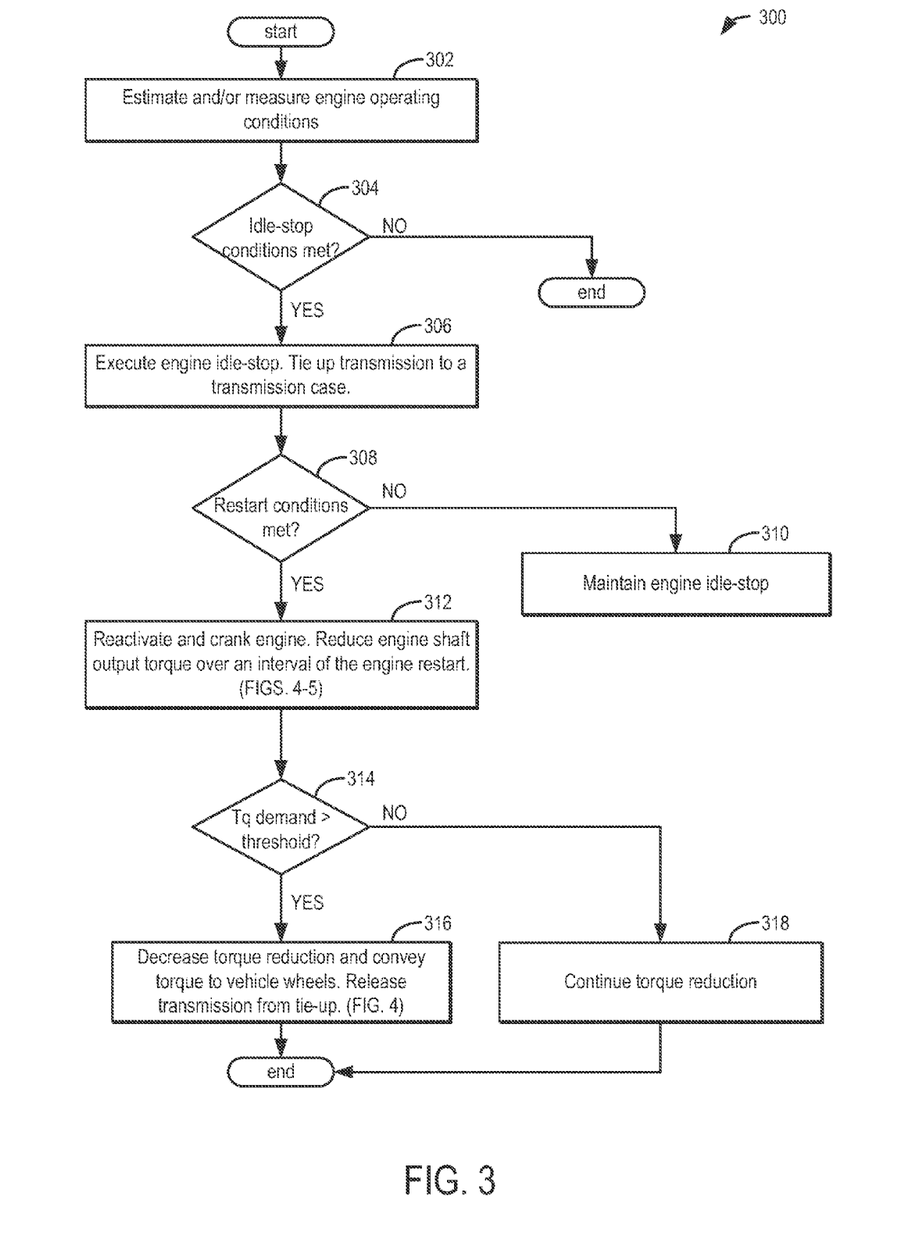
FIG. 3 shows a high level flow chart for shutting down an engine, according to the present disclosure.

Now turning to FIG. 3, an example routine 300 is described for automatically shutting down an engine in response to idle-stop conditions, and automatically restarting the engine in response to restart conditions. The routine enables the engine to be shutdown with the transmission tied up and/or with a transmission gear shifted, and automatically restarted from the shutdown condition while applying at least some torque reduction until a vehicle launch is requested.

At 302, engine operating conditions may be estimated and/or measured. These may include, for example, ambient temperature and pressure, engine temperature, engine speed, crankshaft speed, transmission speed, battery state of charge, fuels available, fuel alcohol content, etc.

At 304, it may be determined if idle-stop conditions have been met. Idle-stop conditions may include, for example, the engine operating (e.g., carrying out combustion), the battery state of charge being above a threshold (e.g., more than 30%), vehicle speed being below a threshold (e.g., no more than 30 mph), no request for air conditioning being made, engine temperature (for example, as inferred from an engine coolant temperature) being above a threshold, no start being requested by the vehicle driver, driver requested torque being below a threshold, accelerator pedal not being pressed, brake pedal being pressed, etc. If idle-stop conditions are not met, the routine may end.

If any or all of the idle-stop conditions are met, then at 306, the controller may execute an automatic engine idle-stop operation and deactivate the engine. This may include shutting off fuel injection and/or spark ignition to the engine. Upon deactivation, the engine may start spinning down to rest. In one example, while the engine is spinning down to rest (for example, when the engine speed is below a threshold speed), the engine controller may tie up the transmission to a transmission case by engaging one or more transmission clutches and locking the engaged transmission clutch(es) to the transmission case, and thereby to the vehicle frame. The hydraulic pressure required to engage and lock the transmission clutch(es) may be provided by the mechanical oil pump, or the electric oil pump if sufficient hydraulic pressure cannot be provided by the mechanical oil pump. The engine may then remain in the shutdown condition with the transmission tied-up until a subsequent engine restart is requested. In another example, while the engine is spinning down to rest (for example, when the engine speed is below a threshold speed), the engine controller may shift (e.g., downshift) the transmission to a gear higher than a transmission first gear (gear_1), for example, to a transmission second gear (gear_2). The engine may then remain in the shutdown condition with the transmission in the gear higher than the transmission first gear (gear_1). As such, shifting the transmission (e.g., upshifting or downshifting) may include adjusting a clutch pressure of an appropriate transmission gear clutch (such as gear clutch 33 of FIG. 1).

While the routine depicts deactivating the engine in response to engine idle-stop conditions, in an alternate embodiment, it may be determined if a shutdown request has been received from the vehicle operator. In one example, a shutdown request from the vehicle operator may be confirmed in response to a vehicle ignition being moved to a key-off position. If an operator requested shutdown is received, the engine may be similarly deactivated by shutting off fuel and/or spark to the engine cylinders, and the engine may slowly spin down to rest. Herein, in one example, in response to a key-off event where all the engine idle-stop conditions are met (e.g., battery state of charge is met), the transmission may be not be tied up during the engine spin down. Alternatively, the transmission may be tied-up in response to idle-stop conditions being met, and then, in response to the key-off event, the transmission may be released from tie-up as soon as the engine speed has dropped below a threshold speed. The engine may then remain shutdown with the transmission released from the tie-up. In either case, the transmission may be released only if the operator has keyed-off and shifted the vehicle to a parking mode (e.g., by shifting a parking pawl to a park position, or by actuating a parking brake). In another example, in response to the key-off event, the transmission may be shifted (e.g., downshifted) to the transmission first gear (gear_1). Alternatively, the transmission may be shifted to a "park" position wherein the transmission is not maintained in gear. The engine may then remain in the shutdown condition with the transmission in that first gear (or not in gear), until a subsequent engine restart request is received.

At 308, it may be determined if automatic engine restart conditions have been met. As such, the automatic engine restart includes restarting the engine in response to restart conditions and without receiving a restart request from the vehicle operator. Restart conditions may include, for example, the engine being in idle-stop (e.g., not carrying out combustion), the battery state of charge being below a threshold (e.g., less than 30%), vehicle speed being above a threshold, a request for air conditioning being made, engine temperature being below a threshold, emission control device temperature being below a threshold (e.g., below a light-off temperature), vehicle electrical load being above a threshold, brake pedals being released, accelerator pedal being pressed, etc. If restart conditions are not met, at 310, the engine may be maintained in the idle-stop status.

In comparison, if any or all of the automatic restart conditions are met, and no restart request is received from the vehicle operator, at 312, the engine may be automatically restarted. This may include reactivating and cranking the engine. In one example, the engine may be cranked with starter motor assistance. Additionally, fuel injection and spark ignition to the engine cylinders may be resumed. In response to the automatic reactivation, the engine speed may start to gradually increase. As shown in FIG. 5, during the restart, the engine may incur an engine speed spike (between t1 and t2) before settling at an idling speed (after t2). As such, the engine speed spike may lead to a corresponding engine shaft output torque spike. In the absence of torque reduction, the spike in engine shaft output torque may cause the vehicle to lurch and degrade the driver's drive feel. Accordingly, at 312, over an interval of the engine restart, an engine torque conveyed to the vehicle wheels may be reduced. The interval may correspond to an interval over which the engine speed spike occurs. As elaborated in FIG. 4, reducing the engine torque may include one or more of upshifting the transmission to a higher gear, maintaining the transmission tied-up to the transmission case, applying an alternator load on the engine, retarding spark timing, engaging one or more transmission clutches, skipping one or more cylinder combustion events, and applying a braking torque. The selected approach(es) may be chosen based on the amount of torque reduction required.

In one example, the transmission may be tied-up during an idle-stop immediately preceding the automatic engine restart. Herein, the transmission may be maintained tied-up during the restart until a vehicle launch is requested or a threshold engine speed is reached. In another example, the transmission may be shifted to a gear higher than the transmission first gear during the idle-stop immediately preceding the automatic engine restart. Herein, the transmission may be maintained in the higher gear during the restart, or may be further upshifted to an even higher gear, such as a transmission third gear (gear_3). Herein, the higher gear may have a lower gear ratio that enables less torque multiplication across the torque converter.

While the routine depicts reactivating the engine in response to automatic engine restart conditions, in an alternate embodiment, it may be determined if a restart request has been received from the vehicle operator. In one example, a restart request from the vehicle operator may be confirmed in response to a vehicle ignition being moved to a key-on position from a previous key-off position. If an operator requested restart request is received, the engine may be similarly reactivated by cranking the engine with start assistance, returning fuel and spark to the engine cylinders, and resuming cylinder combustion. As such, during the preceding key-off event, the engine may have been shutdown with the transmission released from the tie-up and/or with the transmission downshifted to a transmission first gear (gear_1), or out of gear. Accordingly, during the key-on event, while the engine is restarted, the transmission may be tied-up and/or the transmission may be upshifted to a gear higher than the transmission first gear, or into the first gear, until a vehicle launch is requested and/or a threshold engine speed is reached.

Returning to FIG. 3, at 314, it may be determined whether the operator torque demand is higher than a threshold. In one example, the operator torque demand is based on an accelerator pedal position input. For example, the operator torque demand may be higher than a threshold if the accelerator pedal is pushed beyond a threshold position by the vehicle operator during a tip-in event to launch the vehicle. In response to the operator torque demand being higher than the threshold, at 316, the engine torque reduction may be decreased (e.g., substantially immediately decreased). In one example, where the magnitude of the torque demanded is higher, all torque reduction may be stopped. As elaborated in FIGS. 4-5, decreasing the torque reduction may include one or more of downshifting the transmission to a lower gear, releasing the transmission from the tie-up, decreasing the alternator load on the engine, advancing spark timing (or retarding spark timing by a smaller amount), disengaging the one or more transmission clutches, reducing the number of skipped cylinder combustion events, and removing the braking torque. The selected approach(es) may be chosen based on the amount of driveline torque demanded as well as the engine speed at which the torque demand is received.

If the operator torque demand is not higher than the threshold, at 318, torque reduction may be continued. Herein, the torque reduction may be decreased and the transmission may be released from the tie-up only after the engine speed is above a threshold speed, such as above an idling speed, or after transitioning through the engine speed spike.

Figure 4:
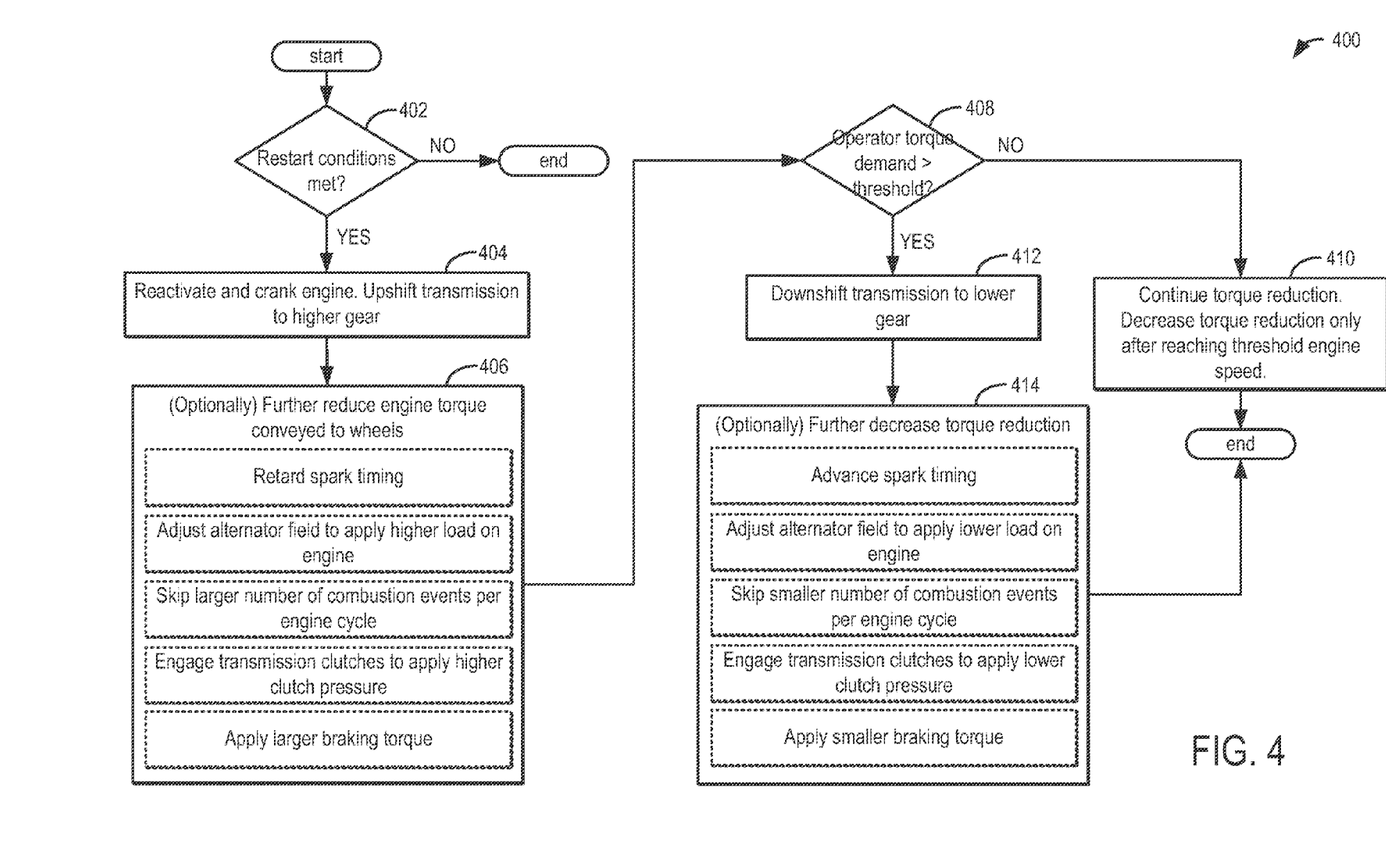
FIG. 4 shows a high level flow chart for restarting the engine with torque reduction, according to the present disclosure.
Figure 5:
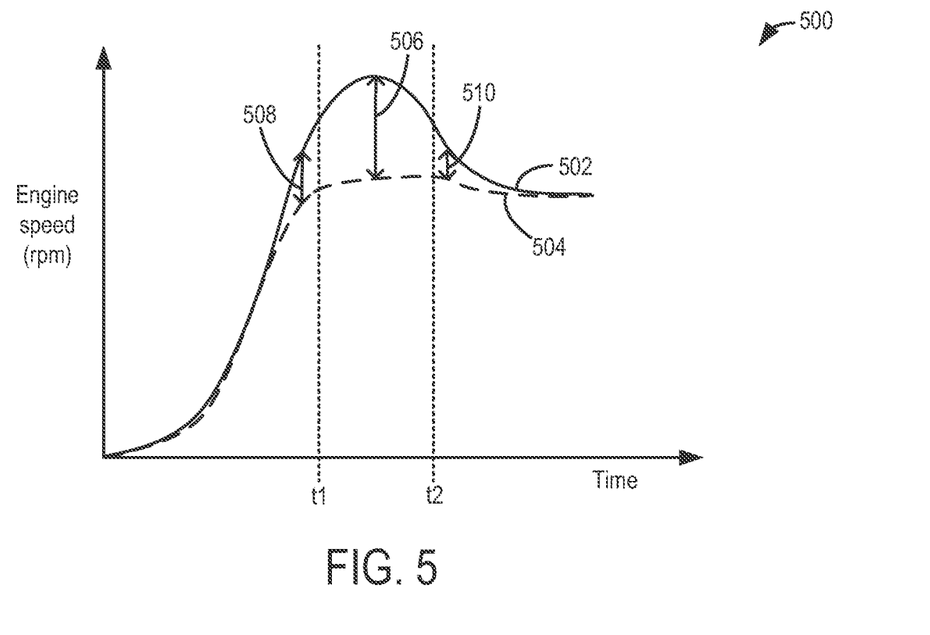
FIG. 5 shows a graph explaining torque reduction approaches during the engine restart to overcome an engine restart speed/torque spike.

Now turning to FIG. 4, an example routine 400 for restarting the engine with torque reduction over an interval of the restart is elaborated. The routine enables an amount of torque reduction to be modulated over the course of the engine restart. In particular, the routine enables the torque reduction to be increased to reduce driveline torque when an engine restart with no vehicle launch is requested, while allowing the torque reduction to be decreased when an engine restart and a vehicle launch is requested.

At 402, automatic engine restart conditions may be confirmed (as at 308 in FIG. 3). Upon confirming restart conditions, at 404, the engine may be restarted with an engine torque conveyed to the wheels reduced over an interval of the restart. For example, the engine may be cranked and restarted with the transmission in a higher gear. This may include upshifting the transmission to a first, higher gear (having a lower gear ratio) during the restart, or, if the transmission was already upshifted during the preceding engine idle-stop, maintaining the transmission in the first, higher gear during the restart. As such, one or more gear clutches (such as gear clutches 33 of FIG. 1) may be adjusted to place the transmission in the selected gear.

Additionally, or optionally, reducing the engine torque may further include, at 406, retarding spark timing (e.g., by a higher amount of spark retard), adjusting the alternator field to apply an alternator load on the engine (e.g., a higher alternator load), skipping one or more cylinder combustion events per engine cycle (e.g., a higher number of skipped events), engaging one or more transmission clutches to apply a clutch pressure (e.g., a higher clutch pressure), applying a braking torque (e.g., a higher wheel braking torque), tying up the transmission to a transmission case (or maintaining the transmission tied-up), etc.

In one example, the combination of approaches used to reduce the conveyed torque may be based on the amount (that is, magnitude) of the torque reduction required. With reference to FIG. 5, it shows a map 500 of an engine restart speed profile (solid line 502) and a desired engine restart torque profile (dashed line 504) over the duration of an engine restart. Between t1 and t2, an engine speed spike may occur leading to a larger difference between the torque output and the torque desired, as compared to before t1 and/or after t2. Accordingly, in one example, during the interval of the engine restart before t1, wherein a smaller amount of torque reduction 508 is desired, the engine torque conveyed to the wheels may be reduced by retarding spark timing. As such, due to the faster response time of a spark timing change, the smaller amount of torque reduction may be rapidly provided by retarding the spark timing. In comparison, during the interval of the engine restart between t1 and t2, wherein a larger amount of torque reduction 506 is desired, the engine torque conveyed to the wheels may be reduced by retarding spark timing and upshifting the transmission to a higher gear. Herein, the combination of the spark timing retard and the transmission upshifting may provide the desired larger amount of torque reduction. In another example, during the interval of the engine restart after t2, wherein an intermediate amount of torque reduction 510 is desired (that is smaller than amount of torque reduction 506 but larger than amount of torque reduction 508), the desired engine torque reduction may be sufficiently provided by upshifting the transmission to the higher gear.

It will be appreciated that while the example of FIG. 5 is illustrated with the use of a combination of spark retard and transmission upshifting, this is not meant to be limiting, and that any combination of various torque reduction approaches may be used based on the amount of torque reduction desired and other engine operating conditions. For example, in alternate embodiments, a combination of transmission gear shifting and alternator load application may be used, etc. The engine controller may be configured to operate in one of numerous modes based on the amount of torque reduction desired and the prevalent engine operating conditions, each mode including a distinct combination of torque reduction approaches.

Returning to FIG. 4, at 408 (as at 314 of FIG. 3), it may be determined whether the operator torque demand is higher than a threshold. This may be based on, for example, an accelerator pedal position. If the operator torque demand is higher than the threshold, then at 412, driveline torque may be returned by decreasing the torque reduction. In one example, decreasing the engine torque reduction may include downshifting the transmission to a lower gear. For example, the controller may downshift the transmission from the first, higher gear to a second, lower gear wherein the first gear has a lower gear ratio than the second gear. Herein, the higher gear ratio of the second gear may enable increased torque multiplication across the torque converter. As used herein, the first higher gear and the second lower gear refer to a first selected gear and a second selected gear and do not necessarily reflect the transmission first gear (gear_1) or the transmission second gear (gear_2).

The first and second gears may be selected based on the operator torque demand, and optionally further based on an engine speed when the operator torque demand is received. For example, when the operator torque demand is higher than a first, smaller threshold, a smaller downshift may be used (e.g., from a transmission third gear to a transmission second gear) while when the operator torque demand is higher than a second, larger threshold, a larger downshift may be used (e.g., from a transmission third gear to a transmission first gear).

The first gear and second gears may also be based on a road incline when the torque demand is received. For example, as the road incline increases, a larger transmission downshift may be applied. In one example, in response to a tip-in received on a higher incline, the transmission may be downshifted from the transmission third gear to the transmission first gear. In comparison, in response to a tip-in received on a lower incline, the transmission may be downshifted from the transmission second gear to the transmission first gear. As such, it will be appreciated that the selection of gears on the incline may also be affected by the vehicle speed when on the incline. In one example, grade estimation may be provided by a longitudinal accelerometer and/or a gyrometer coupled to the vehicle controller.

Decreasing the engine torque reduction may additionally, or optionally include, at 414, advancing spark timing (or retarding spark timing by a lower amount of spark retard), adjusting the alternator field to remove the alternator load on the engine (or applying a smaller alternator load), not skipping one or more cylinder combustion events per engine cycle (or skipping a smaller number of combustion events), disengaging the one or more transmission clutches to release the clutch pressure (or applying a smaller clutch pressure), releasing the braking torque (or applying a smaller wheel braking torque), releasing the transmission from the tie-up, etc.

In one example, the combination of approaches used to decrease the torque reduction may be based on an amount of the torque demand (that is, based on a difference between the current output torque after torque reduction and the desired torque). Further, the approach selected and/or the timing of the transmission shifting (when transmission shifting is used) may be based on an engine speed at which the operator torque demand is received, a rate of change in the torque demand, and/or a road incline when the torque demand is received. The engine controller may be configured to select from the various modes based least on an amount of torque demanded. As such, each mode may include a distinct combination of approaches to decrease the torque reduction.

For example, during a first mode, the engine controller may be configured to downshift the transmission while maintaining an engine shaft output torque (e.g., by maintaining the spark retard, alternator load, clutch pressure, etc.). In another example, during a second mode, the engine controller may be configured to maintain the transmission upshifted while decreasing the engine shaft output torque (e.g., by reducing the spark retard, alternator load, clutch pressure, etc.). In still another example, during a third mode, the controller may be configured to downshift the transmission and decrease the engine shaft output torque. The controller may select from a mode from the first, second, and third modes based on an engine speed at which the operator torque demand is received, and an amount of torque demand.

With reference to FIG. 5, following an accelerator pedal tip-in by the operator, the engine restart speed (and/or torque) profile (solid line 502) and the desired engine restart torque profile (dashed line 504) may overlap. Thus, in response to a tip-in before t1, wherein a smaller amount of torque reduction has to be decreased, the engine may be operated in the second mode including maintaining the transmission upshifted while advancing spark timing to remove torque reduction 508. Herein, due to response time of the spark timing change, by advancing the spark timing, the smaller amount of torque reduction may be rapidly decreased. In comparison, in response to a tip-in between t1 and t2, wherein a larger amount of torque reduction has to be decreased, the engine may be operated in the third mode including downshifting the transmission and advancing the spark timing to remove torque reduction 506. Herein, the combination of the spark advance and the transmission downshifting may be required to decrease the larger amount of torque reduction. Herein, the engine restart torque spike may be advantageously blended with the vehicle acceleration by decreasing the torque reduction. In the same way, in response to a tip-in after t2, wherein an intermediate amount of torque reduction has to be decreased, the engine may be operated in the first mode including downshifting the transmission while maintaining the spark retard to remove torque reduction 510. Herein, the transmission downshifting may suffice to provide the desired decrease in torque reduction. It will be appreciated that while the example of FIG. 5 is illustrated with the use of a combination of spark advance and transmission shifting, this is not meant to be limiting, and that any combination of approaches may be used to decrease the engine shaft output torque based on the amount of torque demand and other engine operating conditions.

Returning to FIG. 4, if the operator torque demand is not higher than the threshold at 408, then at 410 (as at 318 of FIG. 3), the torque reduction may be continued. Specifically, the torque reduction may be decreased (as previously elaborated at 412 and 414) only after the engine speed has reached a threshold speed, such as an idling speed or after transitioning through the engine speed spike.

Figure 6A:
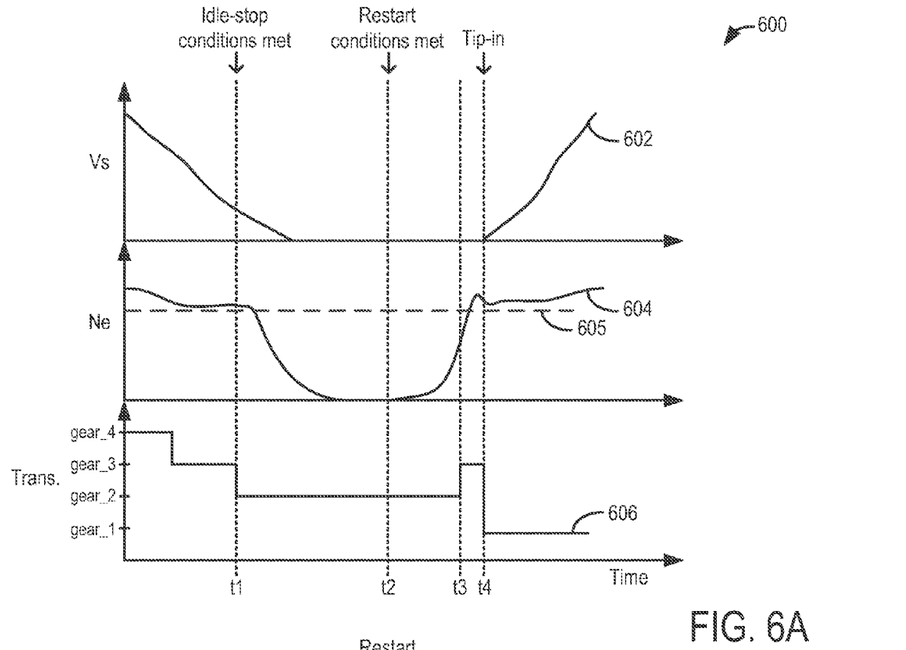
FIGS. 6A-C show maps explaining example engine shutdown and restart procedures, according to the present disclosure.
Figure 6B:
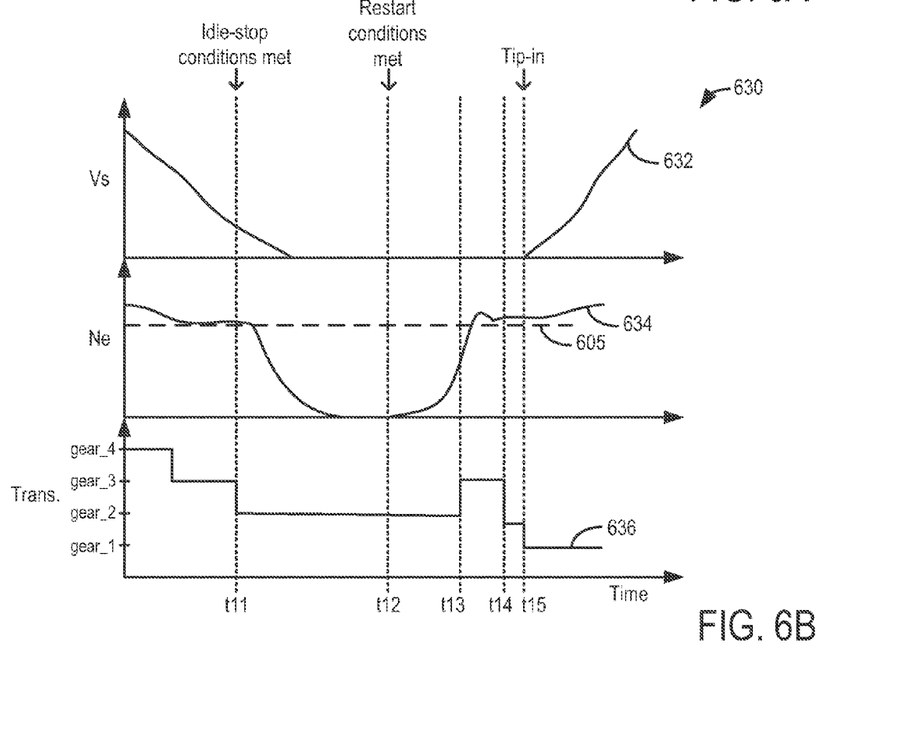
Figure 6C:
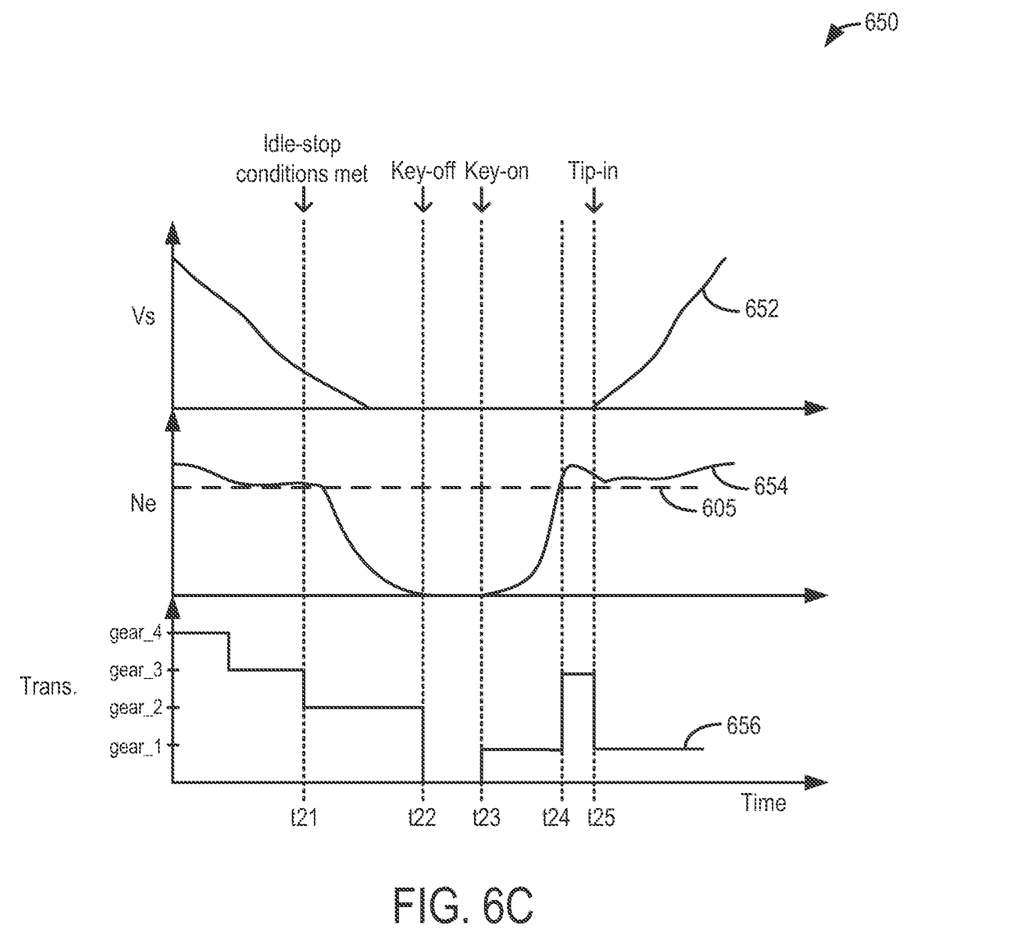

The concepts introduced in the routines of FIGS. 3-4 are now further clarified with example engine shut-down and restart scenarios in FIGS. 6A-C.

FIG. 6A includes a first map 600 depicting a first example shutdown and restart scenario. Changes in vehicle speed (Vs) over time are shown at graph 602. Corresponding changes in engine speed (Ne) are shown at graph 604. Changes in a transmission gear state (Trans.) over the same duration are shown at graph 606. In the depicted example, prior to t1, a vehicle operator may request vehicle deceleration, and the vehicle speed may start to decrease (graph 602). At t1, the vehicle speed may fall below a threshold and idle-stop conditions may be confirmed. Accordingly, at t1, the engine may be deactivated and the engine may start spinning towards rest (graph 604). As the vehicle speed decreases before t1, a controller may gradually downshift the transmission from a higher gear (such as a transmission fourth gear (gear_4)) to a lower gear (such as a transmission third gear (gear_3), and then to a transmission second gear (gear_2)). In the depicted example, the transmission may be in a gear higher than the transmission first gear (gear_1) at the time when the idle-stop is executed. Accordingly, the engine may be deactivated and shutdown with the transmission in gear. Additionally, or optionally, the transmission may be tied-up to a transmission case (and thereby to a frame of the vehicle) during the idle-stop.

At t2, automatic restart conditions may be met. In response to the restart conditions, the engine may be cranked (e.g., with starter assistance) and reactivated with the transmission in gear (herein gear_2) and with the transmission tied-up. At t3, as the engine speed approaches the engine speed spike, the transmission may be (further) upshifted to a higher gear (herein gear_3) for an interval of the restart (herein between t3-t4). The upshifting enables torque reduction and assists the vehicle through the restart with reduced NVH issues. Additionally, the transmission may be maintained tied-up.

At t4, the vehicle operator may tip-in the accelerator pedal to request a vehicle launch. Herein, the tip-in may be requested substantially during the engine speed spike (and before the engine reaches threshold speed 605, such as an idling speed). In response to the tip-in, the transmission may be downshifted from the higher gear (herein gear_3) to a lower gear (herein gear_1) to return driveline torque and prepare the vehicle for the requested vehicle launch. Additionally, the transmission may be released from the tie-up. Herein, by immediately downshifting the transmission and releasing the transmission from the tie-up, the torque spike (from the engine speed spike) may be advantageously blended with vehicle acceleration torque to expedite the vehicle launch.

FIG. 6B includes a second map 630 depicting a second example shutdown and restart scenario. Herein, changes in vehicle speed are shown at graph 632, corresponding changes in engine speed are shown at graph 634, and changes in a transmission gear state are shown at graph 636. Herein, as in the previous example, prior to t11, the vehicle operator may request vehicle deceleration and the vehicle speed may start to decrease (graph 632) with gradual downshifting of transmission gears (graph 634). At t11, the vehicle speed may fall below a threshold speed and idle-stop conditions may be confirmed. Accordingly, at t11, the engine may be deactivated and the engine may start spinning towards rest (graph 634) with the transmission in gear (herein gear_2). Additionally, or optionally, the transmission may be tied-up to a transmission case (and thereby to a frame of the vehicle) during the idle-stop.

At t12, automatic restart conditions may be met responsive to which the engine may be cranked (e.g., with starter assistance) and reactivated with the transmission in gear (herein gear_2) and the transmission tied to a frame of the vehicle. At t13, the transmission may be (further) upshifted to a higher gear (herein gear_3) for an interval of the restart to enable torque reduction while maintaining the transmission tie-up. At t14, once the vehicle has transitioned through the engine speed spike and the engine has reached an idling speed (that is, after threshold speed 605), the transmission may be downshifted (herein, from gear_3 to gear_2) in anticipation of a vehicle launch. Optionally, if tied up, the transmission may be released from the tie-up. While the transmission is downshifted and before the vehicle is launched, the conveyed torque may be reduced via one or more alternate torque reduction approaches previously discussed.

At t15, the vehicle operator may tip-in the accelerator pedal to request the vehicle launch. Herein, the tip-in may be requested substantially after the engine speed spike and after the engine has reached the idling speed (or threshold speed 605). In response to the tip-in, the transmission may be further downshifted, herein from gear_2 to gear_1, to return driveline torque and prepare the vehicle for the requested vehicle launch. Additionally, if the transmission was maintained tied-up, at t15, the transmission may be released to launch the vehicle.

FIG. 6C depicts a third example shutdown and restart scenario at third map 650. Herein, changes in vehicle speed are shown at graph 652, corresponding changes in engine speed are shown at graph 654, and changes in a transmission gear state are shown at graph 656. Herein, as in the previous example, prior to t21, the vehicle operator may request vehicle deceleration and the vehicle speed may start to decrease (graph 652) with gradual downshifting of transmission gears (graph 654). At t21, the vehicle speed may fall below a threshold and idle-stop conditions may be confirmed. Accordingly, at t21, the engine may be deactivated and the engine may start spinning towards rest (graph 654) with the transmission in gear (herein gear_2). Additionally, the transmission may be tied-up to a transmission case (and thereby to a frame of the vehicle) during the idle-stop At t22, the driver may request an engine shutdown by performing a key-off event. In response to the key-off condition, the transmission may be downshifted (e.g., to gear_1) or may be released from being in gear (e.g., the transmission may be shifted to a "park" position). Likewise, the transmission may be released from the tie-up in response to the key-off if the vehicle speed is below a threshold speed (e.g., vehicle is at rest). That is, in one example, the vehicle engine may be kept shutdown without the transmission in gear and without the transmission tied-up. At t23, the vehicle operator may request an engine restart by performing a key-on event. In response to the key-on event, the transmission may be tied up to the transmission case (if the transmission was previously released) and the transmission may be shifted (e.g., upshifted) to the first transmission gear, gear_1, (if the transmission was previously released from being in gear, as depicted). Alternatively, the transmission may be maintained in the tie up (if the transmission was previously tied-up) and the transmission may be shifted (e.g., upshifted) to a gear higher than the first transmission gear (if the transmission was previously in the first transmission gear).

At t24, as the engine speed approaches the speed spike, the transmission may be further upshifted to a higher gear (herein gear_3) while the transmission is maintained tied-up. When the engine speed has cross the speed spike and reached an idling speed (or threshold speed 605), the transmission may be released from the tie-up. At t25, in response to the operator tipping in the accelerator pedal and requesting a vehicle launch, the transmission may be downshifted from the higher gear to a lower gear (herein, back to gear_1) to enable the driveline torque to be restored.

It will be appreciated that while the examples of FIGS. 6A-C depict torque reduction and decrease of torque reduction using transmission gear shifting and transmission tie-up/release, this is not meant to be limiting, and that in alternate examples, other combinations of torque reduction approaches may be used to reduce the engine shaft output torque.

In this way, torque reduction can be used over an interval of the engine restart to reduce the effects of an engine restart torque spike. Likewise, torque reduction can be decreased to substantially blend the engine restart torque spike with a vehicle acceleration torque in response to an accelerator tip-in. By decreasing the torque reduction and blending the restart torque spike with the vehicle acceleration, driveline torque may be returned faster and with fewer NVH issues. As a result, a vehicle launch may be expedited while reducing vehicle lurches and clunks. Overall, the quality of an engine restart can be improved.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle engine coupled to a transmission, comprising:
   during an engine restart from idle-stop, when operator torque demand is lower than a threshold,
      reducing an engine torque conveyed to vehicle wheels over an interval of the engine restart; and
      in response to an operator torque demand being higher than the threshold, decreasing the engine torque reduction.

2. The method of claim 1, wherein the engine is restarted with the transmission in a higher gear.

3. The method of claim 2, wherein decreasing the engine torque reduction includes downshifting the transmission to a lower gear.

4. The method of claim 1, wherein reducing the engine torque includes one or more of upshifting the transmission to a higher gear, tying up the transmission to a transmission case, applying an alternator load on the engine, retarding spark timing, engaging one or more transmission clutches, skipping one or more combustion events, and applying a braking torque.

5. The method of claim 4, wherein decreasing the engine torque reduction includes,
   during a first mode, downshifting the transmission while maintaining the spark retard;
   during a second mode, maintaining the transmission upshifted while advancing spark timing; and
   during a third mode, downshifting the transmission and advancing the spark timing.

6. The method of claim 5, wherein a mode is selected from the first, second, and third modes based on an engine speed at which the operator torque demand is received and an amount of the operator torque demand.

7. The method of claim 5, wherein downshifting the transmission includes shifting the transmission from a first, higher gear to a second, lower gear, the first gear having a lower gear ratio than the second gear.

8. The method of claim 7, wherein the first and second gears are selected based on the operator torque demand and an engine speed when the operator torque demand is received.

9. The method of claim 1, wherein the operator torque demand is based on an accelerator pedal position input.

10. The method of claim 1, wherein decreasing the engine torque reduction includes,
    during a first mode, downshifting the transmission while maintaining an engine shaft output torque;
    during a second mode, maintaining the transmission upshifted while decreasing the engine shaft output torque; and
    during a third mode, downshifting the transmission and decreasing the engine shaft output torque.

11. A method of controlling a vehicle engine coupled to a transmission, comprising
    during an automatic engine restart, restarting the engine with the transmission in a first higher gear; and
    in response to a torque demand being greater than a threshold, shifting the transmission to a second lower gear.

12. The method of claim 11, wherein the first gear and the second gear are selected based on the torque demand and a road incline when the torque demand is received.

13. The method of claim 11, wherein a timing of the shifting is based on a rate of change in the torque demand, and further based on an engine speed when the torque demand is received.

14. The method of claim 11, wherein restarting the engine further comprises,
    restarting the engine with an engine shaft output torque reduced over an interval of the restart.

15. The method of claim 14, wherein in response to the torque demand being greater than the threshold, the engine shaft output torque reduction is decreased.

16. The method of claim 15, wherein the engine shaft output torque reduction includes one or more of applying an alternator load on the engine, skipping one or more combustion events, and retarding a spark ignition timing, engaging a transmission clutch, tying up the transmission to a transmission case, and applying a wheel brake torque.

17. The method of claim 11, further comprising, during an engine shutdown immediately preceding the automatic engine restart, shutting down the engine with the transmission in the first gear.

18. A vehicle system, comprising:
    an engine;
    a transmission coupled to the engine, the transmission including one or more gear clutches;
    an accelerator pedal for receiving a torque demand from a vehicle operator; and
    a control system with computer readable code for,
       during an automatic engine restart,
       restarting the engine;
       adjusting the one or more gear clutches to place the transmission in a first higher gear;
       receiving a torque demand from the vehicle operator; and
       in response to the torque demand being higher than a threshold, shifting the transmission to a second lower gear.

19. The system of claim 18, wherein the control system includes further code for,
    in response to the torque demand being lower than the threshold, maintaining the transmission in the first gear before an engine speed reaches a threshold engine speed; and
    after the engine speed reaches the threshold engine speed, shifting the transmission to the second gear.

20. The system of claim 18, wherein the automatic engine restart includes restarting the engine in response to restart conditions and without receiving a restart request from the vehicle operator.

* * * * *